United States Patent
Wu

(10) Patent No.: US 8,459,810 B2
(45) Date of Patent: Jun. 11, 2013

(54) ADJUSTABLE REAR VIEW MIRROR

(75) Inventor: Pin-Hsing Wu, Chang-Hua Hsien (TW)

(73) Assignee: Ken Sean Industries Co., Ltd., Taiwan (TW)

( * ) Notice: Subject to any disclaimer, the term of this patent is extended or adjusted under 35 U.S.C. 154(b) by 153 days.

(21) Appl. No.: 13/211,020

(22) Filed: Aug. 16, 2011

(65) Prior Publication Data
US 2011/0299186 A1 Dec. 8, 2011

Related U.S. Application Data

(63) Continuation-in-part of application No. 12/576,673, filed on Oct. 9, 2009, now abandoned.

(51) Int. Cl.
G02B 7/182 (2006.01)
G02B 5/08 (2006.01)

(52) U.S. Cl.
USPC .............. 359/872; 359/842; 359/882

(58) Field of Classification Search
USPC .......................................... 359/842, 844, 882
See application file for complete search history.

(56) References Cited

U.S. PATENT DOCUMENTS
4,380,369 A 4/1983 Schacht

*Primary Examiner* — Jade R Chwasz
(74) *Attorney, Agent, or Firm* — Osha Liang LLP

(57) ABSTRACT

An adjustable rear view mirror includes a mounting seat, and a connecting unit including a rotating seat that is rotatably connected to the mounting seat by a first adjusting member on which a first washer is sleeved, and that has a supporting wall unit. A supporting rod has a pivot end pivotably connected to the supporting wall unit by a second adjusting member on which a second washer is sleeved, and an opposite supporting end connected to a rear view mirror body. The first and second washers are coated with PTFE coatings for reducing resistance to rotation of the rotating seat relative to the mounting seat and rotation of the supporting rod relative to the supporting wall unit.

3 Claims, 6 Drawing Sheets

ADJUSTABLE REAR VIEW MIRROR

CROSS-REFERENCE TO RELATED APPLICATION

This application is a continuation-in-part (CIP) of U.S. patent application Ser. No. 12/576,673, filed on Oct. 9, 2009.

BACKGROUND OF THE INVENTION

1. Field of the Invention

The invention relates to a rear view mirror, more particularly to an adjustable rear view mirror.

2. Description of the Related Art

Referring to FIGS. 1 and 2, an adjustable mirror support 5 for a cycle is disclosed in U.S. Pat. No. 4,380,369, The mirror support 5 comprises a cycle mounting seat 51 extending along a first axis (Y), a connecting unit 6, and a mirror mounting support 7. A rear view mirror body 8 is connected to the mirror mounting support 7. The connecting unit 6 includes a rotating arm 61, first and second adjusting members 62, 63, and first and second washers 64, 65. The rotating arm 61 extends along a second axis (X) transverse to the first axis (Y) and has a supporting unit 611.

The first and second adjusting members 62, 63 engage threadedly two screw holes 510, 610 formed respectively in the cycle mounting seat 51 and the supporting unit 611, respectively. The first and second washers 64, 65 are sleeved respectively on the first and second adjusting members 62, 63.

The rotating arm 61 is connected to the cycle mounting seat 51 through the first adjusting member 62, and is changeable between a rotatable state and a non-rotatable state. The mirror mounting support 7 is connected to the supporting unit 611 through the second adjusting member 63, and is changeable between an adjustable state and a non-adjustable state.

To adjust the positions of the rotating arm 61 and the mirror mounting support 7, the first and second adjusting members 62, 63 are loosened to allow change of the rotating arm 61 and the mirror mounting support 7 to the rotatable and the adjustable states, respectively. After the rotating arm 61 and the mirror mounting support 7 are rotated to desired positions, the first and second adjusting members 62, 63 are tightened again to prohibit rotation of the rotating arm 61 and the mirror mounting support 7.

However, it is necessary to loosen and tighten the first and second adjusting members 62, 63 for adjusting such a mirror support each time, which results in inconvenience. Moreover, the area occupied by the mounting seat 51 and the connecting unit 6 is relatively large.

SUMMARY OF THE INVENTION

Therefore, the object of the present invention is to provide an adjustable rear view mirror capable of alleviating the above drawbacks of the prior art.

Accordingly, an adjustable rear view mirror of the present invention comprises a mounting seat, a connecting unit, a supporting rod, and a rear view mirror body. The mounting seat is formed with a screw hole extending along a first axis. The connecting unit includes a rotating seat, a first adjusting member, at least one first washer, a second adjusting member, and at least one second washer. The rotating seat has a main body connected to the mounting seat and rotatable relative to the mounting seat about the first axis. The main body has an abutting wall connected co-rotatably to the main body, and a supporting wall unit that has a pair of juxtaposed first and second supporting walls. The second supporting wall has a screw hole extending along a second axis crossing the first axis. The first supporting wall has a hole that is formed therethrough and that is aligned with the screw hole of the second supporting wall. The first adjusting member has a stem portion extending through the abutting wall of the main body of the rotating seat along the first axis, and engaging the screw hole of the mounting seat, and a head portion connected to an upper end of the stem portion. The first washer is coated with a polytetrafluoroethylene (PTFE) coating, is sleeved on the stem portion of the first adjusting member, and is clamped either between the mounting seat and the abutting wall, or between the head portion of the first adjusting member and the abutting wall. Static friction between the PTFE coating of the first washer and an assembly of the first adjusting member and the mounting seat is sufficient to provide resistance to rotation of the rotating seat relative to the mounting seat. The supporting rod is pivotable relative to the supporting wall unit about the second axis, and has a pivot end pivotally connected to the supporting wall unit, and a supporting end opposite to the pivot end. The rear view mirror body is connected to the supporting end of the supporting rod. The second adjusting member has a stem portion extending through the pivot end of the supporting rod and engaging the screw hole of the second supporting wall, and a head portion connected to an end of the stem portion of the second adjusting member and disposed within the hole in the first supporting wall. The second washer is coated with the PTFE coating, is sleeved on the stem portion of the second adjusting member, and is clamped either between the second supporting wall and the pivot end, or between the head portion of the second adjusting member and the pivot end. Static friction between the PTFE coating of the second washer and the supporting rod is sufficient to provide resistance to rotation of the supporting rod relative to the supporting wall unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
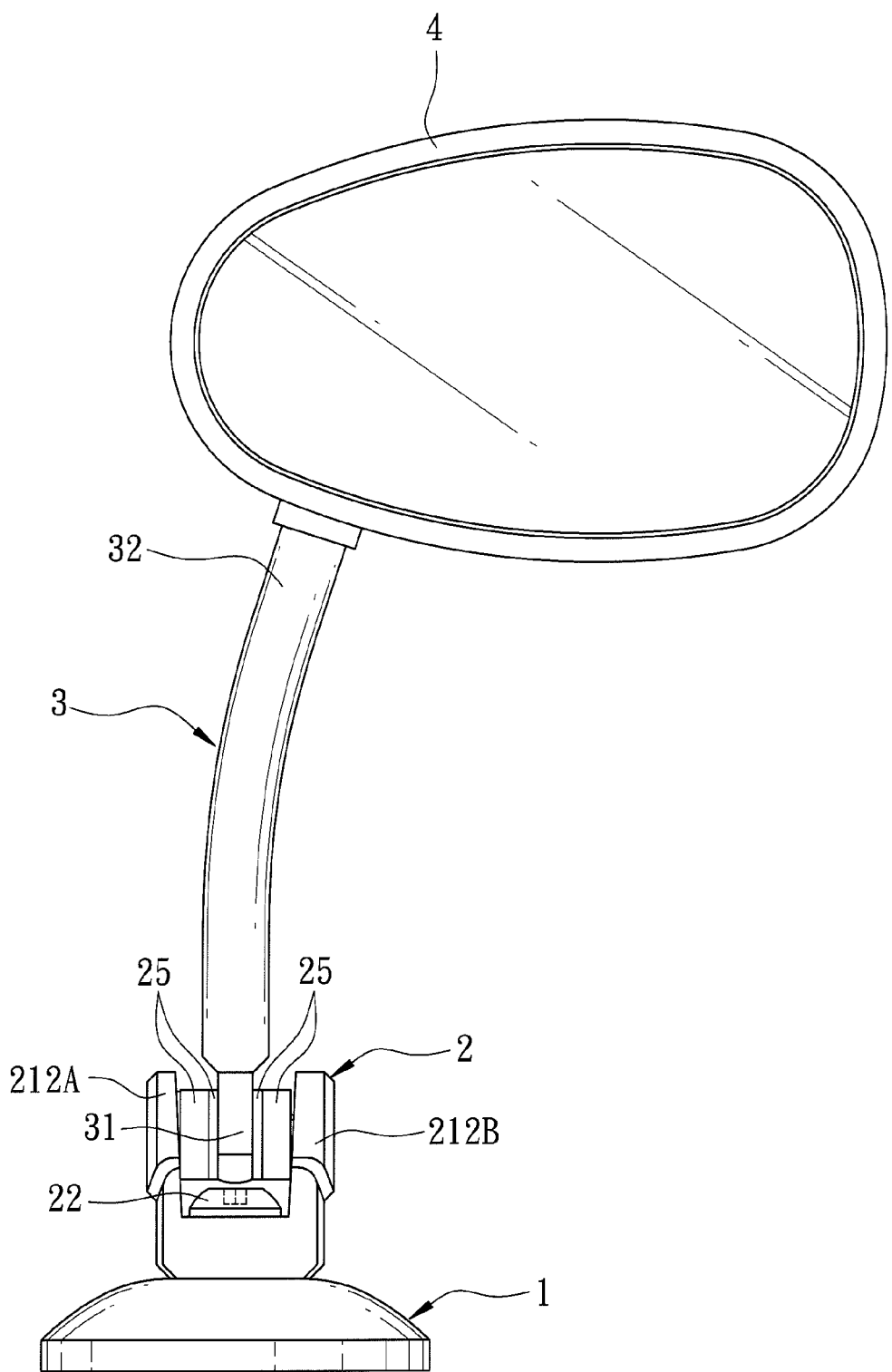
FIG. 3 is a front view of a preferred embodiment of an adjustable rear view mirror according to the present invention.
Figure 4:
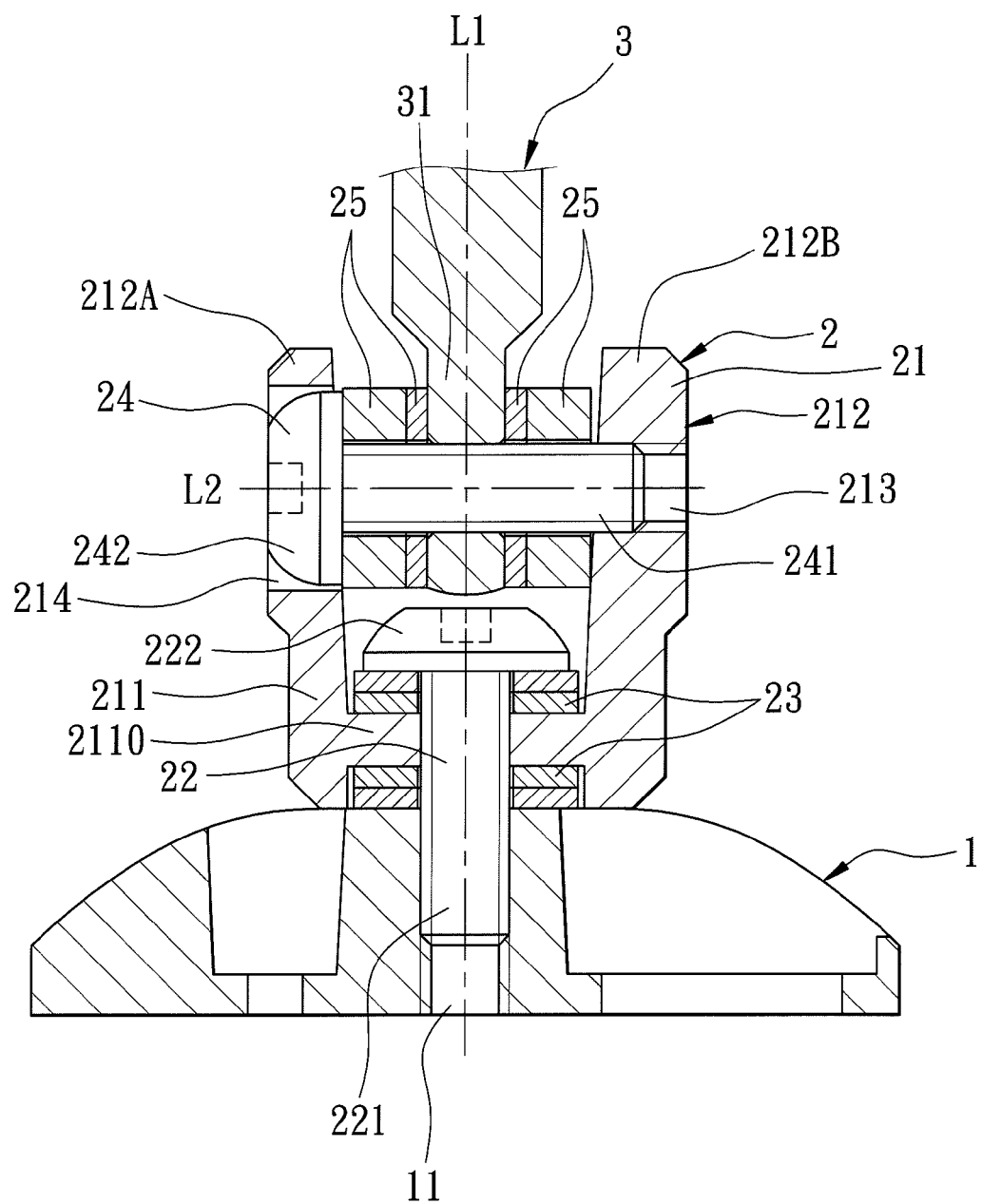
FIG. 4 is a fragmentary sectional view of the preferred embodiment.

As shown in FIGS. 3 and 4, a preferred embodiment of a rear view mirror according to the present invention comprises a mounting seat 1, a connecting unit 2, a supporting rod 3, and a rear view mirror body 4.

The mounting seat 1 is mounted on a handle of a motorcycle (not shown) and is formed with a screw hole 11 extending along a first axis (L1).

The connecting unit 2 includes a rotating seat 21, a first adjusting member 22, a plurality of first washers 23, a second adjusting member 24, and a plurality of second washers 25.

The rotating seat 21 has a main body 211 and a supporting wall unit 212. The main body 211 is connected to the mounting seat 1, is rotatable relative to the mounting seat 1 about the first axis (L1), and has an abutting wall 2110 connected co-rotatably to the main body 211.

The supporting wall unit 212 has a pair of juxtaposed first and second supporting walls 212A, 212B. The second supporting wall 212B has a screw hole 213 extending along a second axis (L2) crossing the first axis (L1). The first supporting wall 212A has a hole 214 that is formed therethrough and that is aligned with the screw hole 213 of the second supporting wall 212B.

The first adjusting member 22 has a stem portion 221 extending through the abutting wall 2110 of the main body 211 of the rotating seat 21 along the first axis (L1) and engaging the screw hole 11 of the mounting seat 1, and a head portion 222 connected to an upper end of the stem portion 221. The first washers 23 are coated with polytetrafluoroethylene (PTFE) coatings and are sleeved on the stem portion 221 of the first adjusting member 22. Two of the first washers 23 are clamped between the head portion 222 of the first adjusting member 22 and the abutting wall 2110. The remaining first washers 23 are clamped between the mounting seat 1 and the abutting wall 2110. It should be noted that, static friction between the PTFE coatings and the head portion 222 of the first adjusting member 22, and between the PTFE coatings and the abutting wall 2110 is sufficient to provide resistance to rotation of the rotating seat 21 relative to the mounting seat 1.

The supporting rod 3 is pivotable relative to the supporting wall unit 212 about the second axis (L2), and has a pivot end 31 pivotally connected to the supporting wall unit 212, and a supporting end 32 opposite to the pivot end 31 and connected to the rear view mirror body 4.

The second adjusting member 24 has a stem portion 241 extending through the pivot end 31 of the supporting rod 3 and engaging the screw hole 213 of the second supporting wall 212B, and a head portion 242 connected to an end of the stem portion 241 of the second adjusting member 24 and disposed within the hole 214 in the first supporting wall 212A.

The second washers 25 are coated with PTFE coatings, and are sleeved on the stem portion 241 of the second adjusting member 24. Two of the second washers 25 are clamped between the second supporting wall 212B and the pivot end 31 of the supporting rod 3. The remaining second washers 25 are clamped between the head portion 242 of the second adjusting member 24 and the pivot end 31. It should be noted that, static friction between the PTFE coatings of the second washers 25 and the pivot end 31 of the supporting rod 3 is sufficient to provide resistance to rotation of the supporting rod 3 relative to the supporting wall unit 212.

Figure 5:
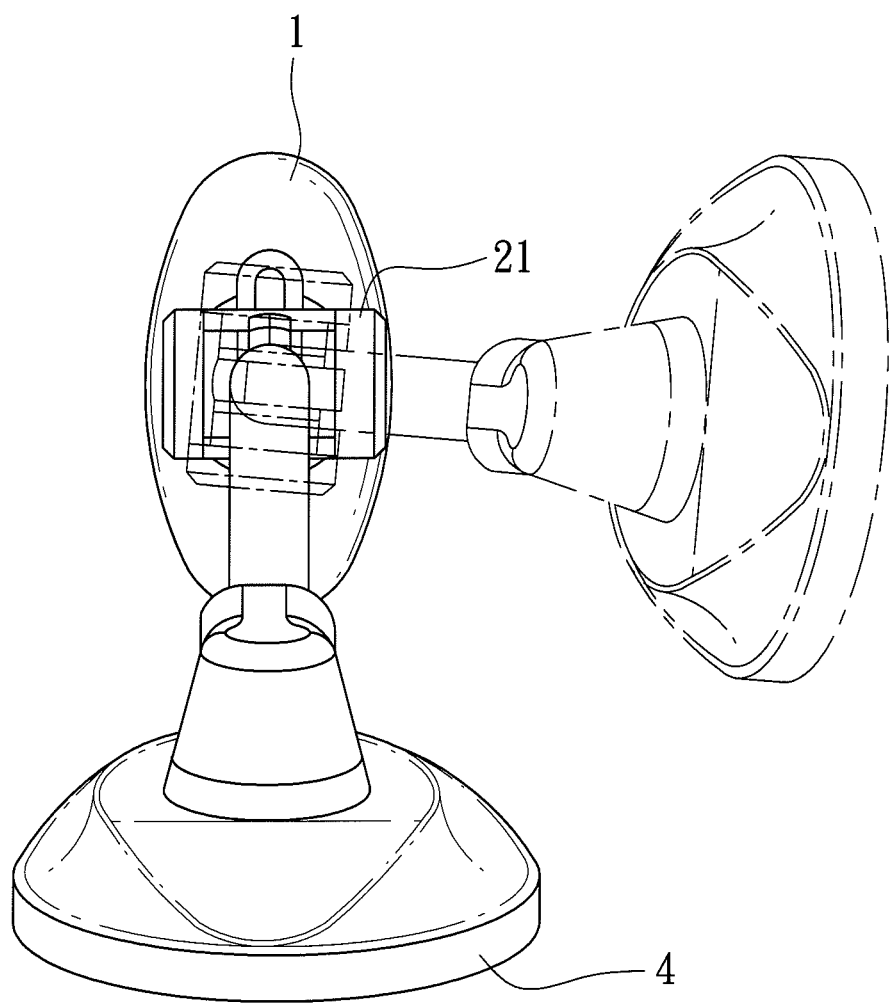
FIG. 5 is a top view of the preferred embodiment, illustrating how a rotating seat is rotated about a first axis.
Figure 6:
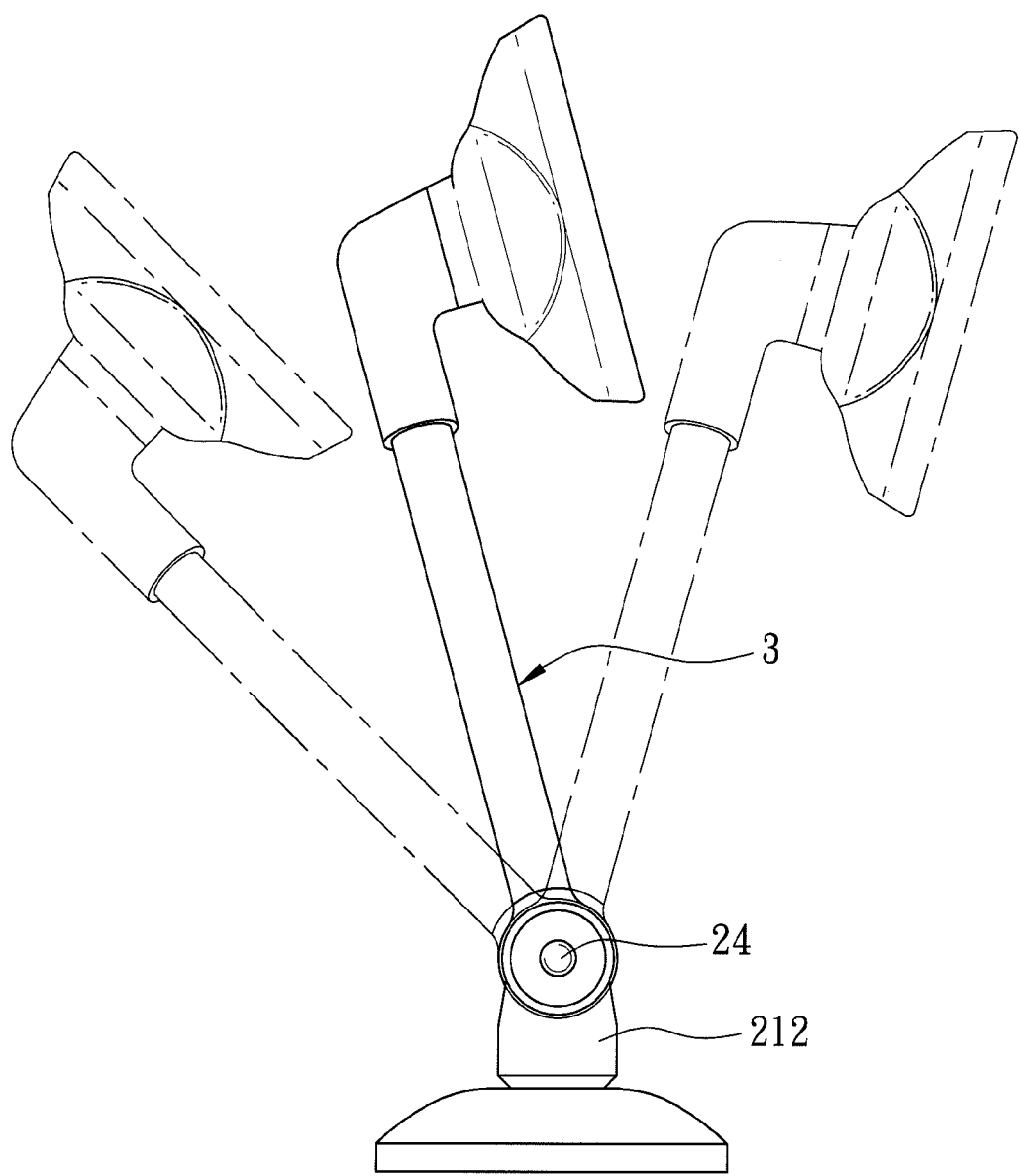
FIG. 6 is a side view of the preferred embodiment, illustrating how a supporting rod is rotated about a second axis.

Referring to FIGS. 5 and 6, the adjustment of the rear view mirror body 4 is as illustrated below. To adjust the position of the rotating seat 21 relative to the mounting seat 1, the rotating seat 21 can be rotated easily relative to the mounting seat 1 about the first axis (L1) (see FIG. 5) as a result of the PTFE coatings of the first washers 23 that provides a relatively small dynamic friction therebetween. After the rotating seat 21 is rotated to a desired position, the static friction between the first washers 23 and the first adjusting member 22, and between the first washers 23 and the abutting wall 2110 can maintain the rotating seat 21 at the desired position.

Similarly, to adjust the position of the supporting rod 3 relative to the supporting wall unit 212, the supporting rod 3 can be pivoted easily relative to the supporting wall unit 212 about the second axis (L2) (see FIG. 6) as a result of the PTFE coatings of the second washers 25 that provides a relatively small dynamic friction therebetween. After the supporting rod 3 is adjusted to a desired position, the static friction between the supporting rod 3 and the supporting wall unit 212 can maintain the supporting rod 3 at the desired position.

It should be noted that, while this invention is exemplified using the two supporting walls 212A, 212B, only one supporting wall may be provided in other embodiments of this invention, in which the second adjusting member 24 is configured as a screw and a nut that engage each other to allow pivoting movement of the supporting rod 3.

Figure 1:
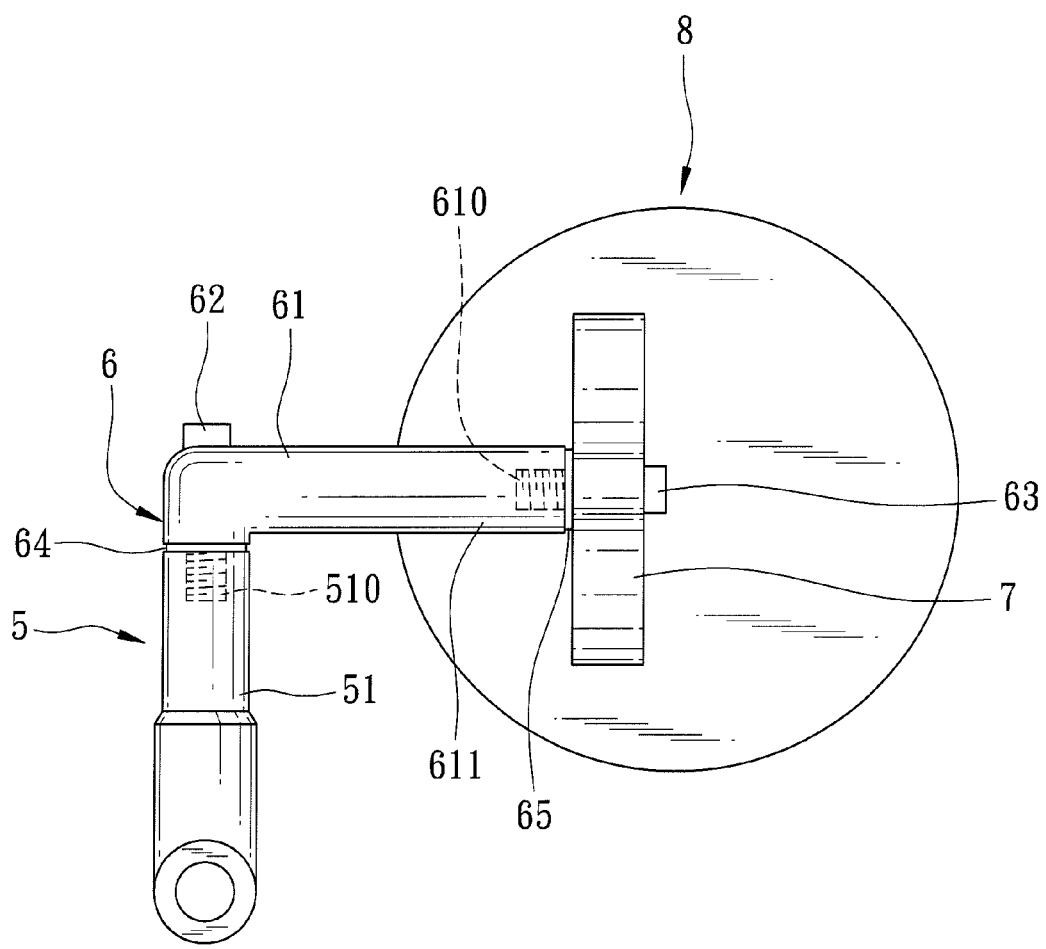
FIG. 1 is a rear view of a mirror support disclosed in U.S. Pat. No. 4,380,369 mounted with a rear view mirror body.
Figure 2:
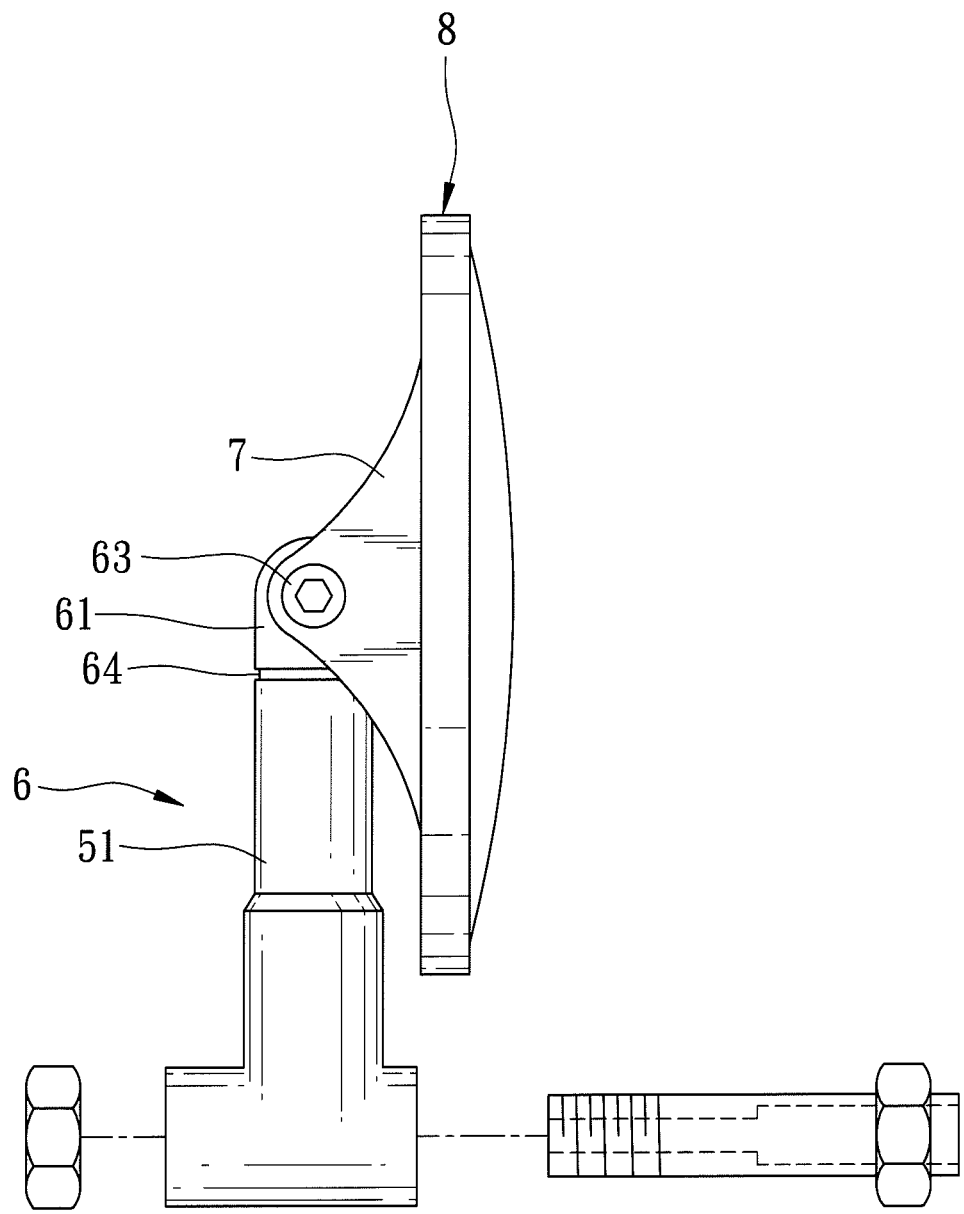
FIG. 2 is a side view of the mirror support of FIG. 1.

To sum up, the advantages of the adjustable rear view mirror according to the present invention are as outlined in the following. In the present invention, by virtue of the PTFE coatings of the first and second washers 23, 25, rotation of the rotating seat 21 and the supporting rod 3 can be implemented easily without loosening and tightening the first and second adjusting members 22, 24. Additionally, an assembly of the mounting seat 1 and the connecting unit 2 occupies a relatively small area as compared to the conventional mirror support 5 illustrated in FIGS. 1 and 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An adjustable rear view mirror, comprising:
   a mounting seat formed with a screw hole extending along a first axis;
   a rotating seat having a main body that is connected to said mounting seat and rotatable relative to said mounting seat about the first axis, and that has an abutting wall connected co-rotatably to said main body, and a supporting wall unit that has a pair of juxtaposed first and second supporting walls, said second supporting wall having a screw hole extending along a second axis crossing the first axis, said first supporting wall having a hole that is formed therethrough and that is aligned with said screw hole of said second supporting wall;
   a first adjusting member having a stem portion that extends through said abutting wall of said main body of said rotating seat along the first axis and that engages said screw hole of said mounting seat, and a head portion that is connected to an upper end of said stem portion;
   at least one first washer coated with a polytetrafluoroethylene (PTFE) coating, sleeved on said stem portion of said first adjusting member, and clamped either between said mounting seat and said abutting wall, or between said head portion of said first adjusting member and said abutting wall, static friction between said PTFE coating of said first washer and an assembly of said first adjusting member and said mounting seat being sufficient to provide resistance to rotation of said rotating seat relative to said mounting seat;
   a supporting rod being pivotable relative to said supporting wall unit about the second axis, and having a pivot end pivotally connected to said supporting wall unit, and a supporting end opposite to said pivot end;
   a rear view mirror body being connected to said supporting end of said supporting rod;
   a second adjusting member having a stem portion that extends through said pivot end of said supporting rod, and that engages said screw hole of said second supporting wall, and a head portion that is connected to an end of said stem portion of said second adjusting member and that is disposed within said hole in said first supporting wall; and at least one second washer coated with the PTFE coating, sleeved on said stem portion of said second adjusting member, and clamped either between said second supporting wall and said pivot end, or between said head portion of said second adjusting member and said pivot end, static friction between said PTFE coating of said second washer and said pivot end of said supporting rod being sufficient to provide resistance to rotation of said supporting rod relative to said supporting wall unit.

2. The adjustable rear view mirror as claimed in claim 1, comprising two of said first washers, one of said first washers being clamped between said mounting seat and said abutting wall, the other one of said first washers being clamped between said head portion of said first adjusting member and said abutting wall.

3. The adjustable rear view mirror as claimed in claim 1, comprising two of said second washers, one of said second washers being clamped between said pivot end of said supporting rod and said second supporting wall, the other one of said second washers being clamped between said head portion of said second adjusting member and said pivot end.

* * * * *